(12) United States Patent
Wickliffe et al.

(10) Patent No.: US 8,303,443 B2
(45) Date of Patent: Nov. 6, 2012

(54) SIX LINK FRONT DERAILLEUR

(75) Inventors: Christopher A. Wickliffe, Ogden, UT (US); Eldon L. Goates, Colorado Springs, CO (US)

(73) Assignee: Wick Werks, LLC, Ogden, UT (US)

( * ) Notice: Subject to any disclaimer, the term of this patent is extended or adjusted under 35 U.S.C. 154(b) by 639 days.

(21) Appl. No.: 12/562,964

(22) Filed: Sep. 18, 2009

(65) Prior Publication Data

US 2010/0075788 A1    Mar. 25, 2010

Related U.S. Application Data

(60) Provisional application No. 61/192,540, filed on Sep. 18, 2008.

(51) Int. Cl.
*F16H 59/00* (2006.01)
(52) U.S. Cl. ............................................. 474/80; 474/82
(58) Field of Classification Search .................... 474/80, 474/82, 72, 70; 29/428
See application file for complete search history.

(56) References Cited

U.S. PATENT DOCUMENTS

| | | | | |
|---|---|---|---|---|
| 6,491,597 B2 * | 12/2002 | Chen | ............................... | 474/82 |
| 6,629,903 B1 * | 10/2003 | Kondo | ............................. | 474/82 |
| 2004/0239071 A1 | 12/2004 | Chamberlain et al. | | |
| 2005/0143206 A1 | 6/2005 | Tetsuka et al. | | |
| 2007/0298920 A1 | 12/2007 | Nakai et al. | | |
| 2008/0300076 A1 * | 12/2008 | Fukushima et al. | ............ | 474/80 |

* cited by examiner

*Primary Examiner* — Michael Mansen
*Assistant Examiner* — Robert T Reese
(74) *Attorney, Agent, or Firm* — Paul C. Oestreich; Eminent IP, P.C.

(57) ABSTRACT

A front derailleur for shifting a bicycle chain between chain rings of a bicycle crank set. The front derailleur may include an attachment mechanism for securing the derailleur to a bicycle frame member. The front derailleur may further include a chain guide for enclosing a bicycle chain and contacting the chain during shifting. The front derailleur may further include a six link movement mechanism adjustably affixed to the attachment mechanism and chain guide for selectively moving the chain guide and enclosed bicycle chain during shifting.

18 Claims, 11 Drawing Sheets

SIX LINK FRONT DERAILLEUR

CROSS-REFERENCE TO RELATED APPLICATION

This nonprovisional patent application claims benefit and priority under 35 U.S.C. §119(e) of the filing of U.S. Provisional Patent Application Ser. No. 61/192,540 filed on Sep. 18, 2008, titled "SIX LINK FRONT DERAILLEUR", the contents of which are hereby incorporated by reference, for all purposes, as if fully set forth herein.

BACKGROUND OF THE INVENTION

1. Field of the Invention

The present invention relates generally to bicycle front derailleurs used to shift a bicycle chain from one chain ring to another chain ring on a bicycle crank set. More particularly, this invention relates to a novel six link front derailleur.

2. Description of Related Art

Bicycle front derailleurs are well known in the art. A front derailleur is used to shift gears on a bicycle crank set that has at least two and perhaps three different sized chain rings. Generally speaking, a front derailleur includes an attachment mechanism for securing the front derailleur to the bicycle frame, a chain guide that surrounds the bicycle chain at all times, and a movement mechanism that selectively positions the chain guide over a given chain ring, consequently shifting the position of the bicycle chain to the given chain ring. The movement mechanism of a front derailleur is typically controlled by a shifting cable attached to a shift lever or gripshifter that provides tension against a biasing element such as a spring that urges the front derailleur to a particular starting position.

The attachment mechanism of a bicycle front derailleur may be a circular clamp used to surround a bicycle frame member such as a seat tube or other frame member. Alternatively, the attachment mechanism may be bolt and bracket configured for mating with a corresponding bracket that has been brazed, welded, or otherwise affixed to a bicycle frame member.

The chain guide of a front derailleur may be of the conventional inner and outer guide member variety that laterally exerts a force against the enclosed chain, causing the chain to be displaced laterally and eventually catch upon the teeth of the adjacent chain ring during a shift. U.S. Pat. No. 4,734,083 to Nagano is an example of a conventional front derailleur with conventional inner and outer guide members forming the chain guide. More recently, chain guides having improved shifting characteristics, i.e., that lift up and pull down on the bicycle chain during shifting have been developed and are disclosed in U.S. Pat. No. 6,454,671 to Wickliffe.

There are many variations on conventional movement mechanisms for bicycle front derailleurs. For example, U.S. Pat. No. 4,734,083 to Nagano describes a relatively common four link movement mechanism. U.S. Pat. No. 6,454,671 to Wickliffe discloses a linear movement mechanism for a front derailleur, based on dual guide rods. U.S. Pat. No. 5,649,877 to Patterson discloses a linear movement mechanism for a front derailleur, based on a single piston mechanism. Most conventional movement mechanisms rely on spring biasing and opposing control cable tension. However, alternatives to cable driven front derailleurs have been proposed. For example, a pneumatic actuation system for driving a front bicycle derailleur movement mechanism has been proposed in U.S. Pat. No. 6,159,119 to Nakamura et al. Additionally, an electrical motor for driving for driving a front bicycle derailleur movement mechanism has been proposed in U.S. Pat. No. 7,331,890 to Ichida et al.

However, there is a need in the art for a robust bicycle front derailleur that is capable of significant vertical displacement of a chain guide. It would also be useful if an embodiment of a front derailleur included a horizontal adjustment feature for positioning the chain guide relative to the chain rings. It would be further useful if an embodiment of a front derailleur included a mechanism for preventing a bicycle chain from falling inside of the inner chain ring during an over-shift condition. It would be useful if an embodiment of a front derailleur were configured with a chain guide that could lift up and pull down on a bicycle chain during shifting.

SUMMARY OF THE INVENTION

An embodiment of a front derailleur movement mechanism for shifting a bicycle chain is disclosed. The front derailleur movement mechanism may be located between a fixed bicycle frame member and a chain guide for selectively shifting the chain guide surrounding a bicycle chain to realize gear shifting between inner and outer chain rings of a crank set during pedaling. According to this embodiment of a derailleur, the movement mechanism may include six links connected at seven pivot points.

A front derailleur for shifting a bicycle chain is disclosed. The embodiment of a derailleur may include an attachment mechanism configured for affixing the front derailleur to a bicycle frame member and a chain guide configured for surrounding and contacting a bicycle chain during shifting. The embodiment of a derailleur may further include a movement mechanism supported by the attachment mechanism and supporting the chain guide, the movement mechanism configured for selectively positioning the chain guide above selected chain rings, thereby causing the bicycle chain to shift gears. The movement mechanism may further include seven pivot points and six links. The movement mechanism may further comprise a first link formed between first and second pivot points, located adjacent to the chain guide. The movement mechanism may further comprise a second link beginning at the first pivot point and extending away from the chain guide and ending at a third pivot point. The movement mechanism may further comprise a third link beginning at the second pivot point and extending away from the chain guide and parallel to the second link, connected to a fifth pivot point at an intermediate position along the third link and ending at a fourth pivot point. The movement mechanism may further comprise a fourth link beginning at the fourth pivot point, connected to the third pivot point at an intermediate position along the fourth link and ending at a sixth pivot point. The movement mechanism may further comprise a fifth link extending from the fifth pivot point toward a seventh pivot point. The movement mechanism may further comprise a sixth link fixed to the attachment mechanism extending between the sixth and seventh pivot points.

A front derailleur having an attachment mechanism for attachment to a bicycle frame member and a chain guide configured for surrounding a bicycle chain and a movement mechanism connected between the attachment mechanism and the chain guide is disclosed. The movement mechanism may further include a first pivot point rotationally connecting a first link on the chain guide with a second link extending from the chain guide. The movement mechanism may further include a second pivot point rotationally connecting the first link on the chain guide to a third link extending from the chain guide, wherein the first and second pivot points are spaced apart from each other and the second and third links are oriented parallel to one another. The movement mechanism may further include a fifth pivot point located at an intermediate position along the third link and rotationally connected to a fifth link. The movement mechanism may further include a fourth pivot point located opposite the second pivot point on the third link, the fourth pivot point rotationally connected to a fourth link. The movement mechanism may further include a third pivot point located along the fourth link, the third pivot point rotationally connecting the second link to the fourth link, the first and third pivot points disposed at opposite ends of the second link. The movement mechanism may further include a sixth pivot point located opposite the fourth pivot point on the fourth link, the sixth pivot point rotationally connecting the fourth link to a sixth link. The movement mechanism may further include a seventh pivot point located opposite the sixth pivot point on the sixth link, the seventh pivot point rotationally connecting the sixth link to the fifth link.

Additional features and advantages of the invention will be set forth in the description which follows, and in part will be apparent from the description, or may be learned by the practice of the present invention.

BRIEF DESCRIPTION OF THE DRAWINGS

The following drawings illustrate exemplary embodiments for carrying out the invention. Like reference numerals refer to like parts in different views or embodiments of the present invention in the drawings.

DETAILED DESCRIPTION

Figure 1:
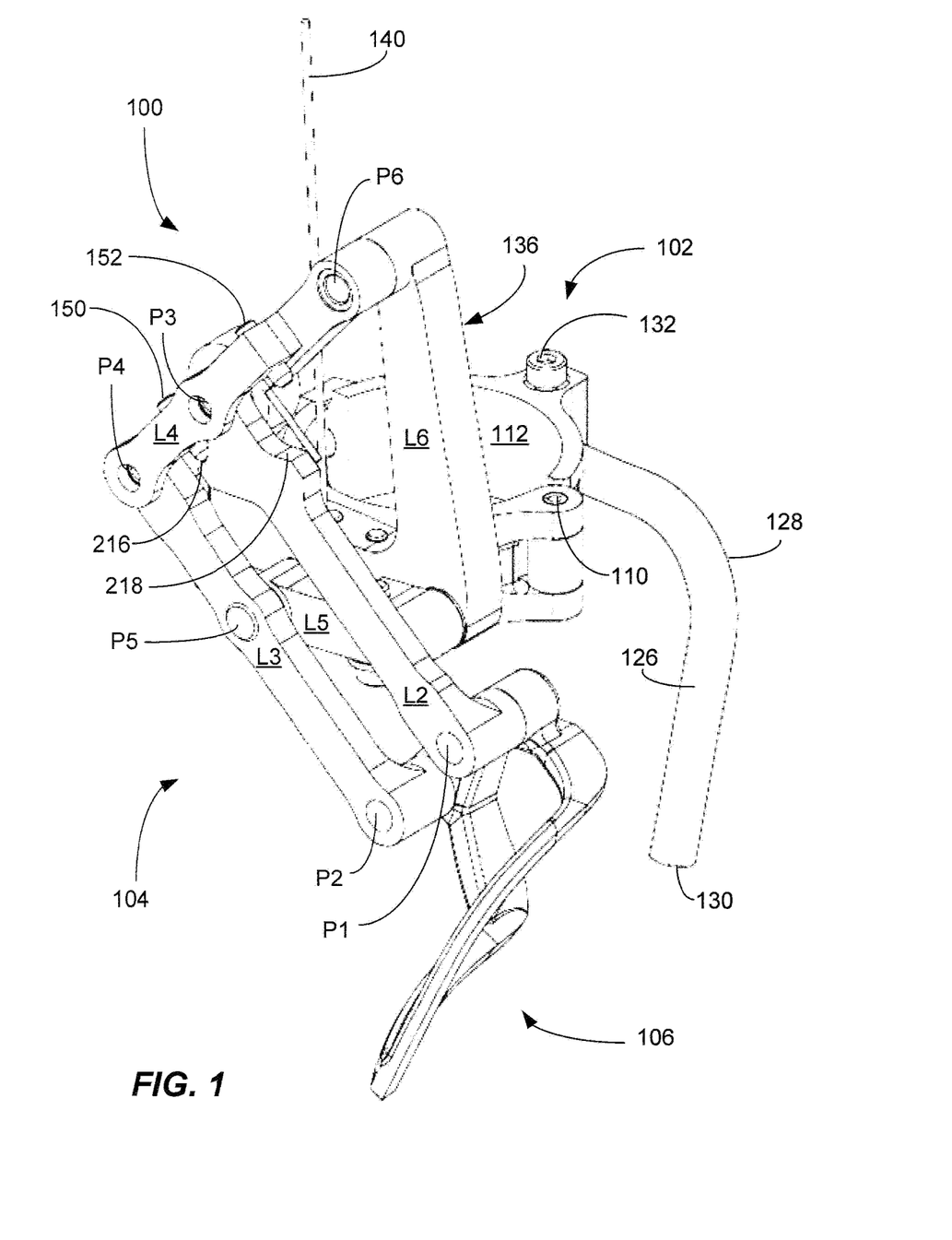
FIG. 1 is a right-rear perspective view of an embodiment of a six link front derailleur according to the present invention.
Figure 2:
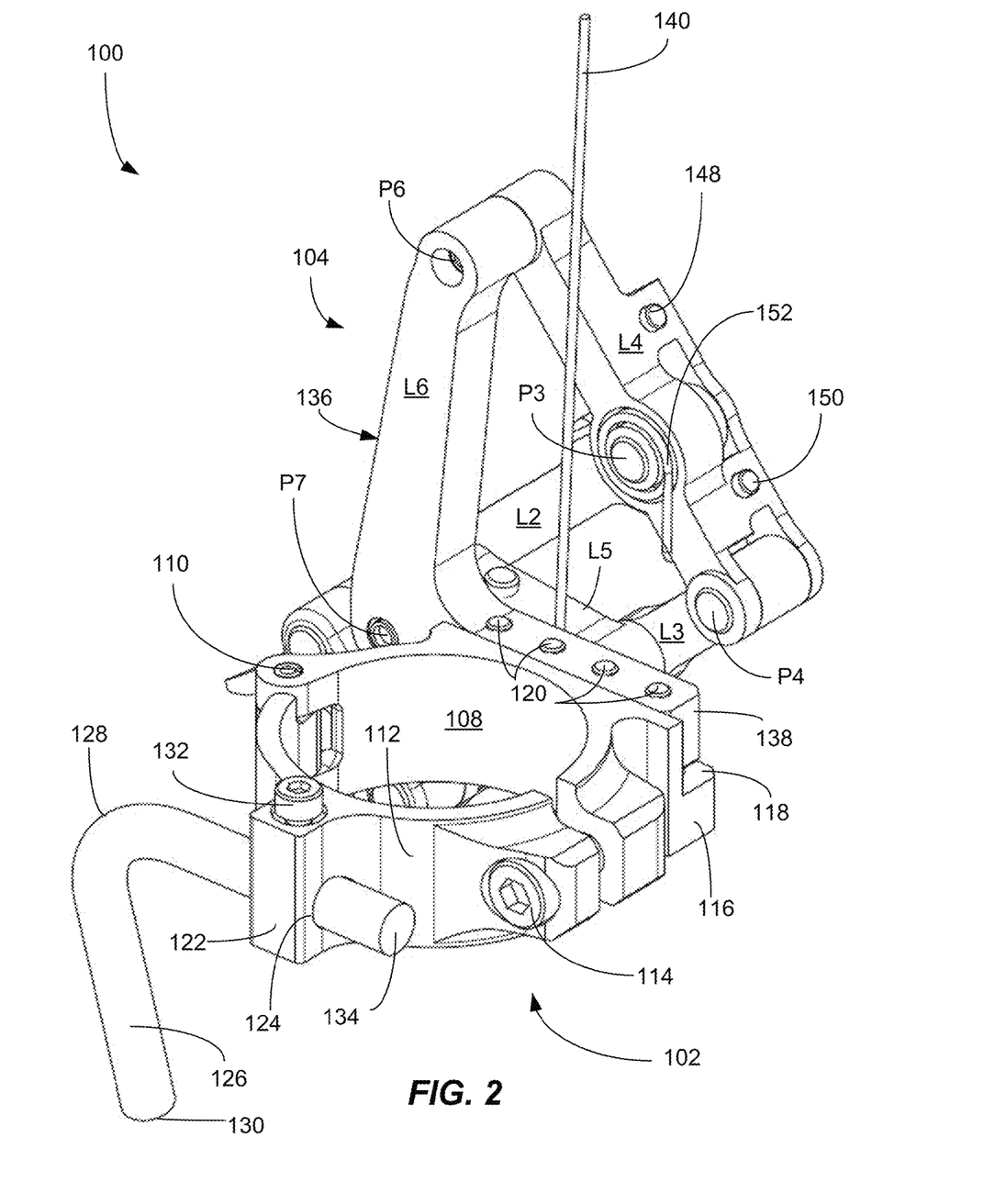
FIG. 2 is a left-front perspective view of an embodiment of a six link front derailleur according to the present invention.

FIGS. 1 and 2 are rear and front perspective views of an embodiment of a six link front derailleur, shown generally at arrow 100, according to the present invention. Derailleur 100 may include an attachment mechanism, shown generally at arrow 102, a movement mechanism, shown generally at arrow 104, and a chain guide, shown generally at arrow 106. Derailleur 100 is particularly useful for precisely shifting a bicycle chain (see, e.g., FIGS. 9-15) from one chain ring to another chain ring of a bicycle crank set in order to shift gears on a bicycle (not shown). The illustrated embodiment of a derailleur 100 is capable of shifting between three chain rings of a crank set, i.e., a "triple crank set". However, it will be understood that the invention is not so limited. Derailleur 100, or embodiments based on the teaching herein, may also be used to shift between only two chain rings of a "double crank set". A "crank set" as used herein may include a right crank arm spider for supporting two or three chain rings, a left crank arm and a bottom bracket spindle with associated bearing for mounting in a bottom bracket of a bicycle frame. Pedals are generally mounted to ends of the crank arms.

Attachment mechanism 102 functions to affix the derailleur 100 to a bicycle frame member (not shown). For many conventional bicycle frames, the seat tube (not shown) is the most common frame member for attaching a front derailleur of any kind. However, some bicycle frame geometries, particularly full-suspension mountain bike frames, and other unique bicycle frames may include some other frame structural member near the crank set for front derailleur attachment. Bicycle frame geometries, structural members and how they are assembled, are all well known to those of ordinary skill in the art and, thus, will not be further elaborated herein.

The embodiment of an attachment mechanism 102 illustrated in FIGS. 1-2 is configured to wrap around a cylindrical frame member, such as a seat tube, at a location just above a crank set. Attachment mechanism 102 may include a semi-circular shaped mounting member 108 with a hinge 110 for rotational connection to a semi-circular shaped hinged member 112. Mounting member 108 and hinged member 112 may be secured in place around a cylindrical frame member (not shown) using a mounting bolt 114 located opposite the hinge 110.

The embodiment of a mounting member 108 illustrated in FIGS. 1-2 may include a ridge 116 forming a shelf 118 extending along an outer portion of mounting member 108 that may be used to secure the movement mechanism 104 to the attachment mechanism 102. A particularly useful feature of derailleur 100 is that movement mechanism 104 may be horizontally adjusted by sliding movement mechanism 104 along shelf 118 of ridge 116 and securing the movement mechanism in place using one or more adjustment bolts 120 (4 shown in FIG. 2).

The embodiment of a hinged member 112 illustrated in FIGS. 1-2 may further include a deflector structure 122 having an opening 124 passing through it for receiving a chain deflector bar 126. For example, the proximal end 134 of chain deflector bar 126 may be pushed through the opening 124. The chain deflector bar 126 is especially useful for preventing the bicycle chain (not shown) from falling off of the innermost chain ring (not shown). The opening 124 may be an annular hole as illustrated in FIGS. 1-2, or may be square, triangular, hexagonal or other polygonal cross-section according to other embodiments. Chain deflector bar 126 has a round cross-section or cylindrical in nature to facilitate precise rotational adjustment within opening 124, according to a presently preferred embodiment. Chain deflector bar 126 may or may not include one or bends 128 (one shown in FIG. 2) to facilitate positioning of the distal end 130 near the innermost chain ring (not shown). Chain deflector bar 126 may be secured within the opening 124 using a deflector bolt 132 or any other suitable means known to those of ordinary skill in the art. Functionally, a properly configured, downward-angled, chain deflector bar 126 allows an over-shifted bicycle chain to slide back down onto the teeth of the innermost chain ring.

Derailleur 100 may be configured with any suitable chain guide that is configured to surround and selectively move a bicycle chain from one chain ring to the next according to various embodiments. The embodiment of a chain guide 106 shown, e.g., in FIG. 1, may include specially shaped guide members and be configured to lift up on the bicycle chain during an up-shift and pull down on the bicycle chain during a down-shift. Detailed description regarding such specially shaped chain guides suitable for chain guide 106 of derailleur 100 may be found in U.S. Pat. No. 7,025,698 to Wickliffe, U.S. Patent Publication No. 2006/0019782 to Wickliffe, and U.S. Design Pat. No. D510,548 to Wickliffe, the contents of all of which are hereby incorporated by reference, for all purposes, as if fully set forth herein.

Figure 3:
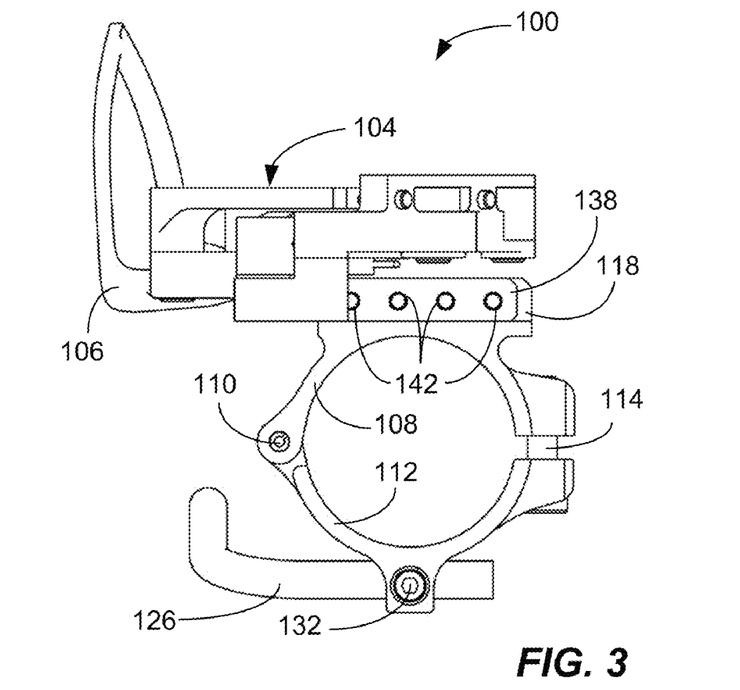
FIG. 3 illustrates a top view of an embodiment of a six link front derailleur, according to the present invention.
Figure 4:
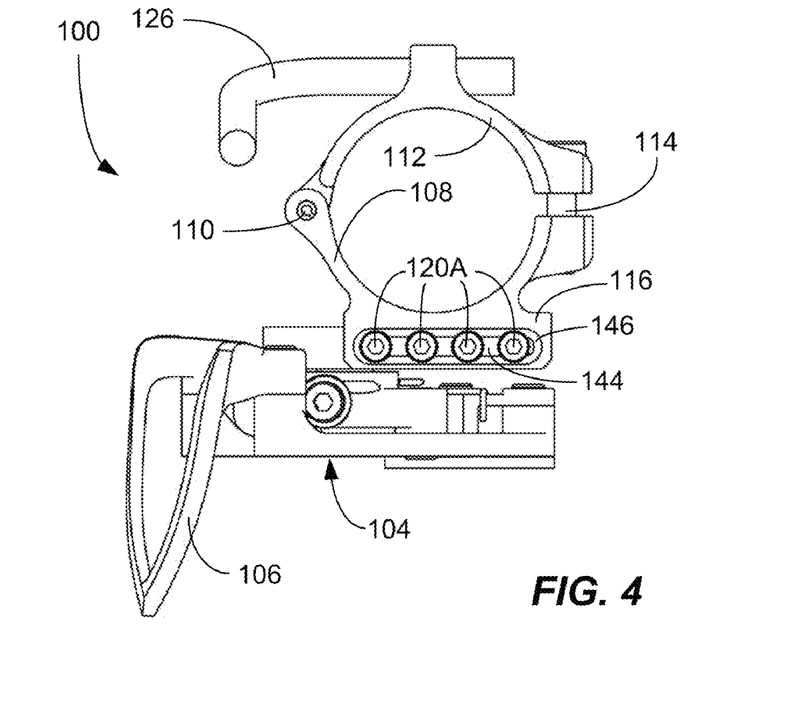
FIG. 4 illustrates a bottom view of an embodiment of a six link front derailleur, according to the present invention.

Movement mechanism 104 may include an "L-shaped" ground arm 136 having a mounting base 138 (FIG. 2) and six link L6 extending nearly perpendicular from the base 138. Referring to FIG. 3, which illustrates a top view of an embodiment of a derailleur 100, according to the present invention, base 138 may be configured with threaded holes for receiving the threaded portions of adjustment bolts 120. Referring to FIG. 4, which illustrates a bottom view of an embodiment of a derailleur 100, according to the present invention, with ridge 116 may include a slot 144 for slidably supporting the heads 120A of adjustment bolts 120 which may rest on a shoulder 146 formed in ridge 116 adjacent to slot 144. According to a reversed alternative embodiment of the invention (not illustrated), the mounting base 138 may be configured with a slot (similar to slot 144 of FIG. 4) for slidably receiving the heads 120A of adjustment bolts 120 and likewise, ridge 116 may be configured with threaded holes for receiving the threaded portions of adjustment bolts 120.

The embodiment of a movement mechanism 104 shown in FIGS. 1 and 2 includes six links L1-L6 (not all visible in either view, however see FIG. 7 and related discussion below) that are rotationally linked together at seven pivot points P1-P7 (also not all visible in either view). As shown in FIG. 1, second link L2 may be configured with a low stop 216 and a high stop 218 configured to interfere with low stop set screw 150 and high stop set screw 152, respectively. Derailleur 100 may be controlled by a control cable 140 that may be attached at, or near, the fifth pivot point P5 on the fifth link L5, in any conventional manner known to those of ordinary skill in the art, e.g., a screw with or without a hooked washer, or a bolt with a cable hole and nut. Such an attachment means is not shown in FIGS. 1-16 for clarity of illustrating the other novel features of the invention.

Figure 17:
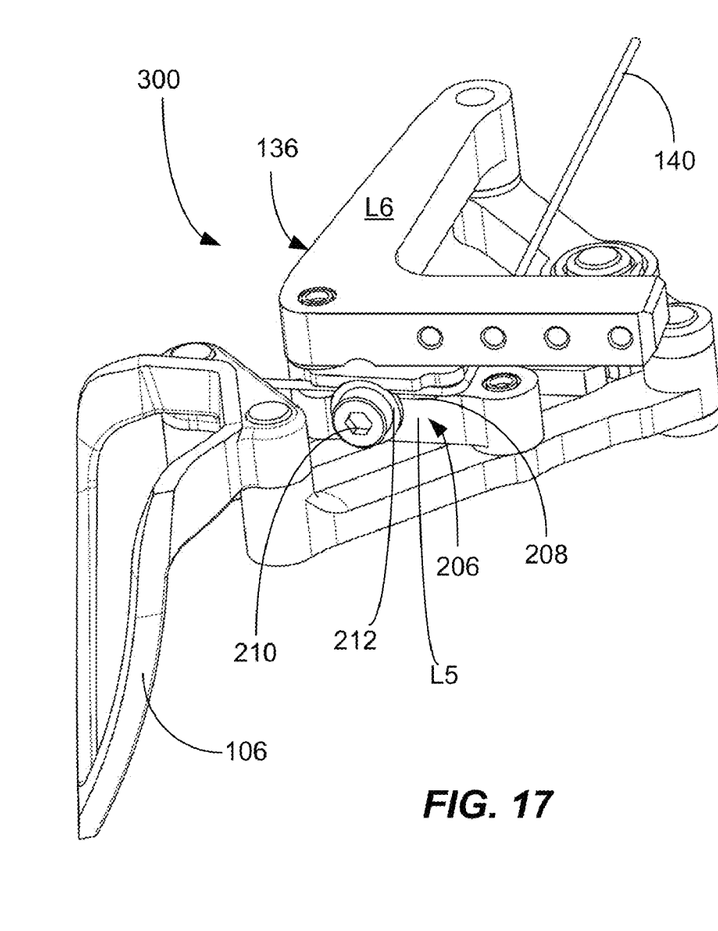
FIG. 17 illustrates a portion of an embodiment of a six link front derailleur including an embodiment of a cable attachment mechanism from a bottom perspective, according to the present invention.

However, FIG. 17 illustrates a bottom view of a portion an embodiment of a six link front derailleur 300 including an embodiment of a cable attachment mechanism 206, according to the present invention. The attachment mechanism 102 has been removed to facilitate viewing of the cable attachment mechanism 206 adjacent to the L-shaped ground arm 136 that forms link L6 in FIG. 17. Cable attachment mechanism 206 may include a cable channel 208 formed in fifth link L5 for receiving a control cable 140. The control cable 140 may be secured to fifth link L5 by a screw 210 and an optional knurled washer 212 for clamping the control cable 140 into the cable channel 208.

Figure 18:
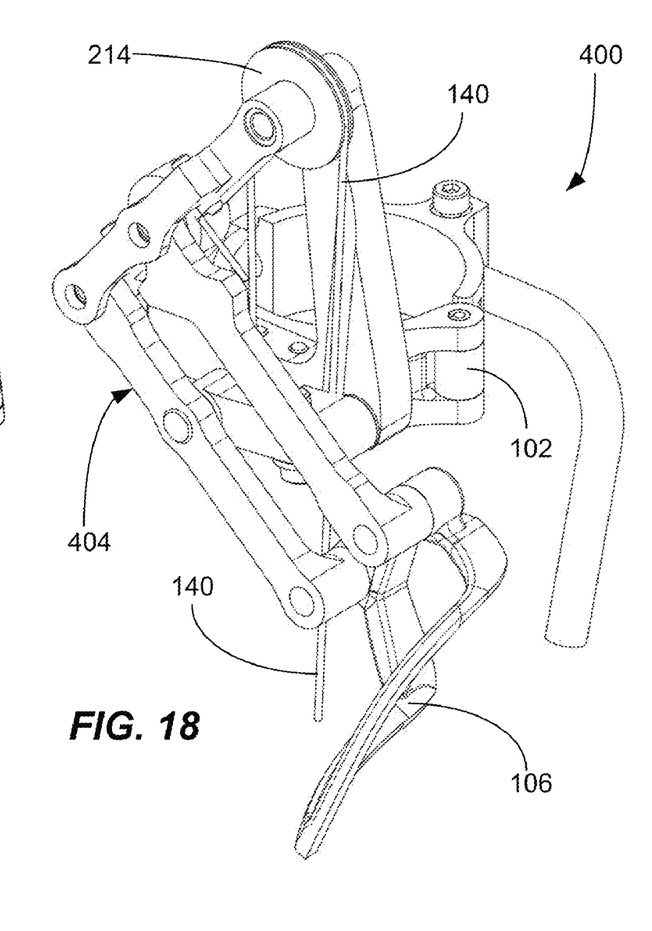
FIG. 18 illustrates a right-rear perspective view of an embodiment of a six link front derailleur having a bottom pull cable configuration, according to the present invention.

The front derailleurs 100, 200 and 300 illustrated in FIGS. 1-17 are of a "top-pull" cable configuration. That is to say that the control cable 140 pulled from the top of the derailleur to overcome the spring bias. FIG. 18 illustrates a front perspective view of an embodiment of a six link front derailleur 400 having a bottom pull cable configuration, according to the present invention. The bottom pull configuration is achieved using a cable pulley 214 located at or between links L4 and L5, i.e., at sixth pivot point P6. The cable pulley 214 essentially translates downward "bottom pull" cable motion into a "top-pull" orientation for use with movement mechanism 404.

Figure 5:
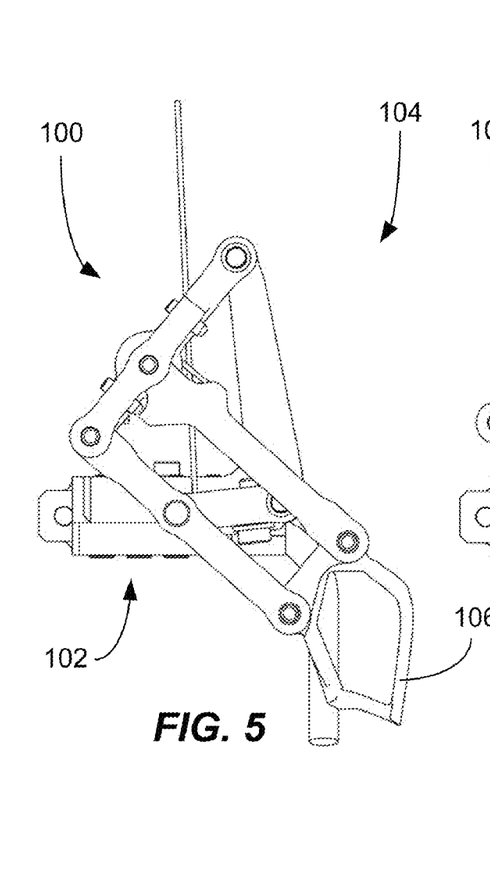
FIGS. 5-7 illustrate rear views of an embodiment of a six link front derailleur in inner, middle and outer gear positions, according to the present invention.
Figure 6:
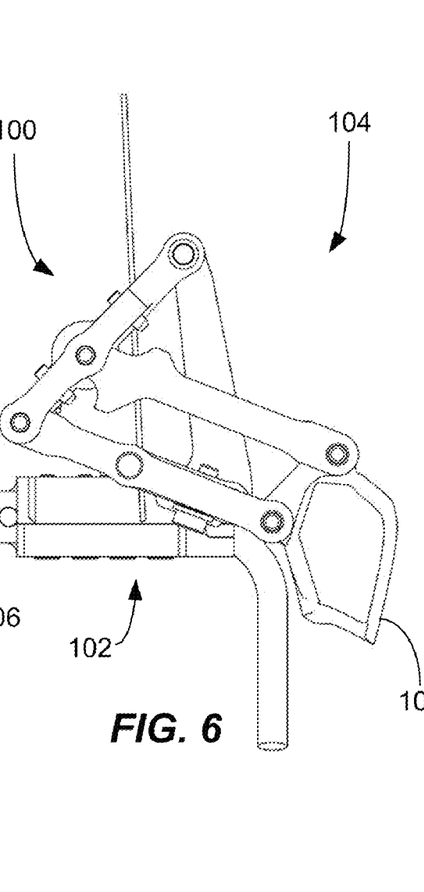
Figure 7:
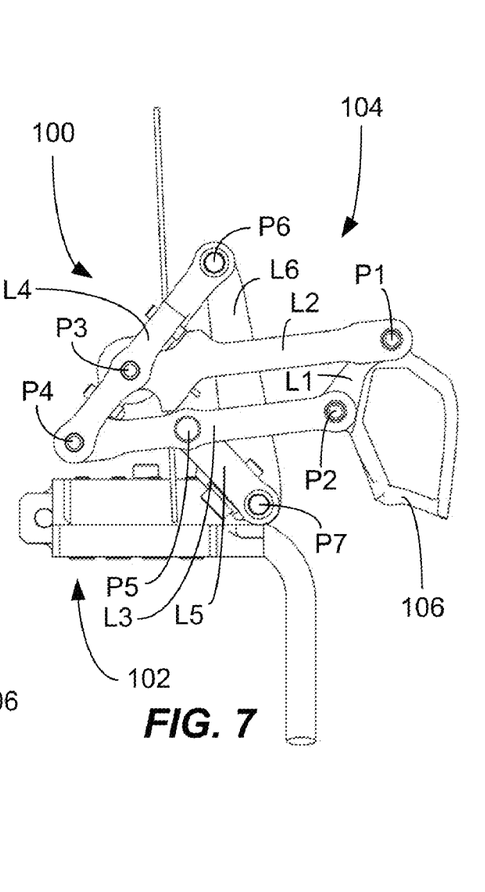

Referring now to FIGS. 5-7, rear views of an embodiment of a derailleur 100 in inner, middle and outer gear positions are illustrated, according to the present invention. The views shown in FIGS. 5-7 illustrate movement of the chain guide 106 both horizontally and vertically. As noted above, alternative embodiments of derailleur 100 may be configured for shifting a bicycle chain on a double crank set having two chain rings and, thus, two gear positions—inner and outer gear positions. It should be evident that unlike many conventional front derailleur mechanisms, derailleur 100 provides significantly more vertical movement than horizontal movement.

Figure 8:
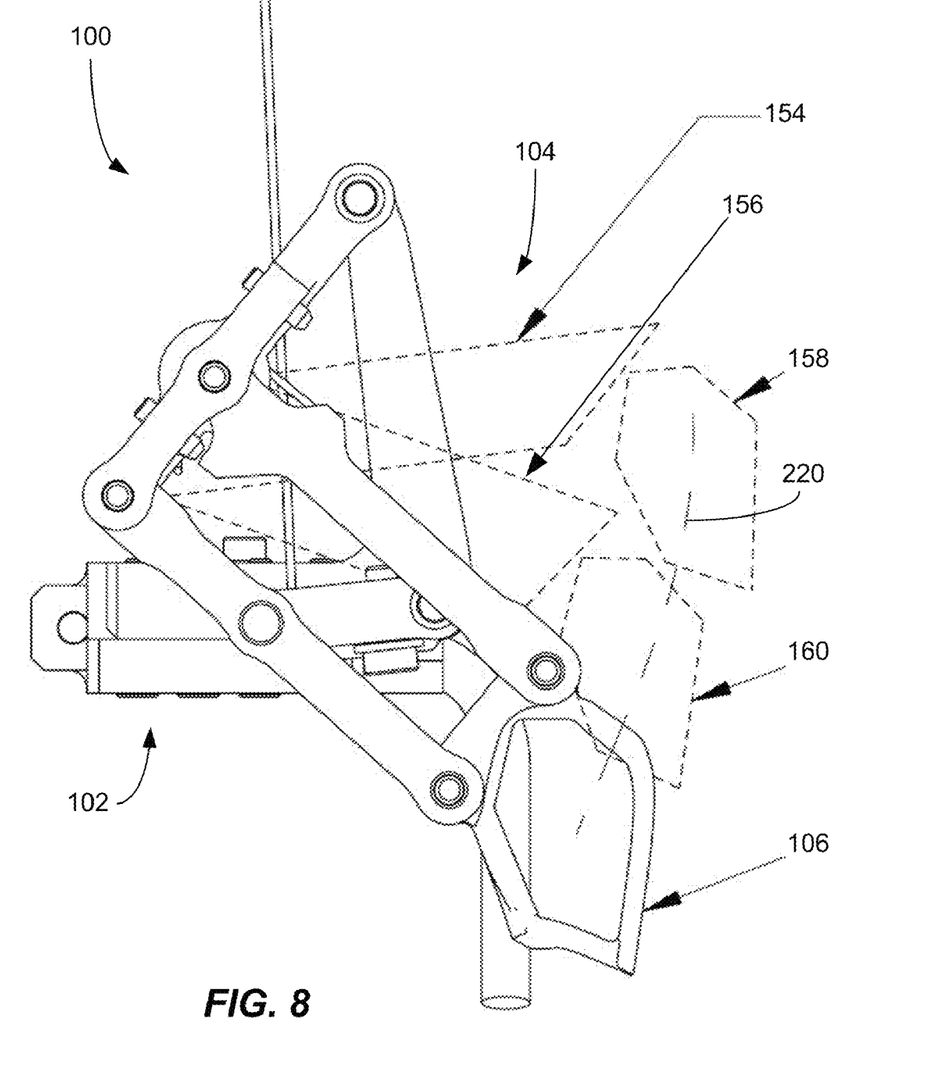
FIG. 8 illustrates a rear view of an embodiment of a six link front derailleur in the inner gear position and line of action according to the present invention.
Figure 9:
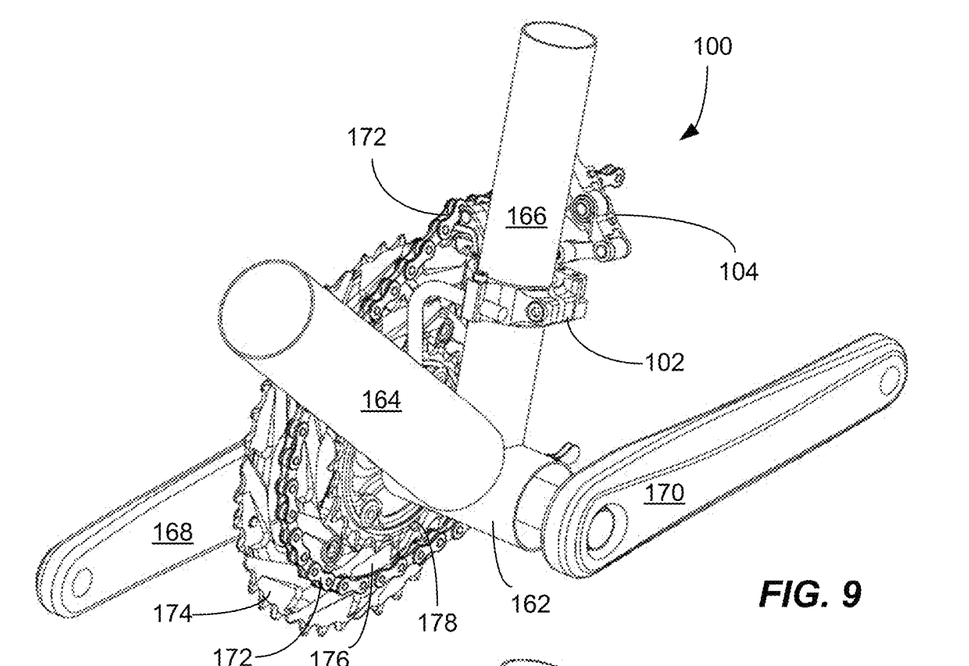
FIG. 9 illustrates a left-front perspective view of an embodiment of a six link front derailleur during an up-shift from a middle gear position to a upper gear position, according to the present invention.
Figure 10:
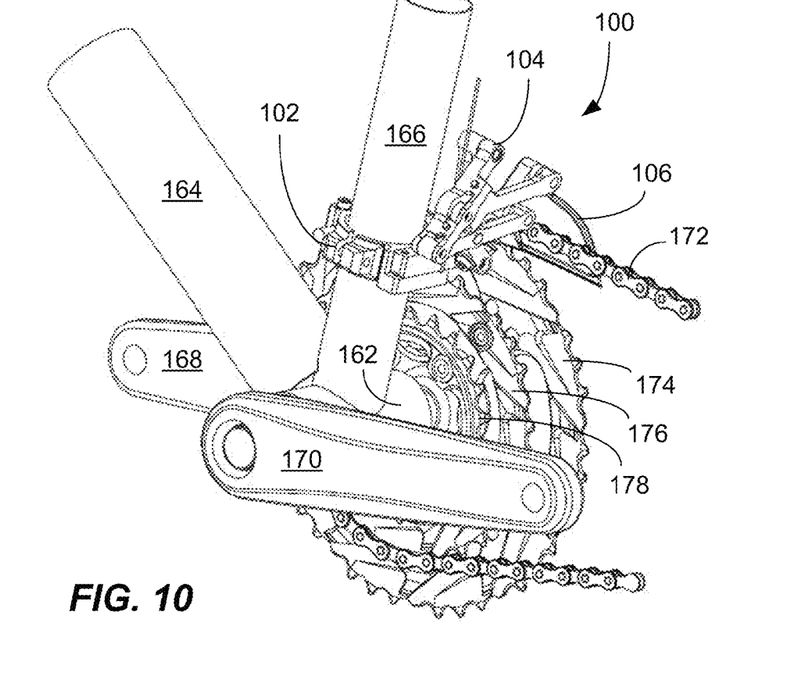
FIG. 10 illustrates a left-rear perspective view of an embodiment of a six link front derailleur during an up-shift from a middle gear position to a upper gear position, according to the present invention.

Referring now to FIG. 7, movement mechanism 104 will be described mechanically in terms of its six links (L1-L6) and seven connecting pivot points (P1-P7). Note that the center lines of each of the seven pivot points P1-P7 are all parallel to each other. The first link L1 forms part of the chain guide 106 and is a support between the first pivot point P1 and the second pivot point P2. The first link L1 and the first and second pivot points P1 and P2 are located adjacent to the chain guide 106. The second link L2 extends between, and is connected to, the first pivot point P1 and the third pivot point P3. That is to say, the second link L2 extends away from the chain guide 106 at the first pivot point P1 and ends at the third pivot point P3. The third link L3 begins at the second pivot point P2, extending away from the chain guide 106 and parallel to the second link L2. The third link L3 ends at the fourth pivot point P4. The third link L3 further includes a fifth pivot point P5 at a location between the second pivot point P2 and the fourth pivot point P4. The fourth link L4 begins at the fourth pivot point P4 and connects to the second link L2 at the third pivot point P3 at an intermediate point along the fourth link L4. The fourth link L4 ends at a sixth pivot point P6. The fifth link L5 extends from the fifth pivot point P5 toward a seventh pivot point P7. The sixth link L6 is fixed to the attachment mechanism 102 and extends between the sixth and seventh pivot points. In operation, pivot point P5 is mechanically biased down in the inner gear position shown in FIG. 5. The bias element may be a torsion spring FIG. 8 illustrates the rear view of an embodiment of a derailleur 100 in the inner gear position as shown in FIG. 5 with phantom positioning for the middle and outer gear positions. More specifically, FIG. 8 illustrates centerlines of outer and middle parallelograms 154 and 156, i.e., short dashed lines connecting pivot points P1-P4 of the movement mechanism 104 and outer and middle guide centerlines (see arrows 158 and 160) representing the chain guide 106 in the corresponding outer and middle gear positions. As can be seen from these three gear positions and the line of action (long dashed lines at 220), movement mechanism provides and essentially vertical lift to a bicycle chain (not shown) as it reaches the outer gear position 154 and 158. An embodiment of derailleur 100 is further capable of an "over-travel" condition during an up-shift into the outer gear position. Over-travel is a condition where the chain guide 106 lifts slightly higher than position 158 shown in FIG. 8 before settling back into an indexed shift position. This feature may provide relatively quick up-shifts without pushing the bicycle chain outside of the outer chain ring. This feature also solves a noted over-shift problem with some linear movement mechanisms that require the use of chain guard along the outer edge of the outer chain ring. It will be understood that the relatively linear line FIGS. 9 and 10 illustrate a left-front and a left-rear perspective views, respectively, of an embodiment of a six link front derailleur 100 during an up-shift from a middle gear position to a upper gear position, according to the present invention. As can be seen in FIGS. 9 and 10, the bicycle chain 172 is actually lifted by the chain guide 106 during the up-shift. This is in contrast to conventional front derailleur chain guides that only push from the side of the bicycle chain 172.

Figure 11:
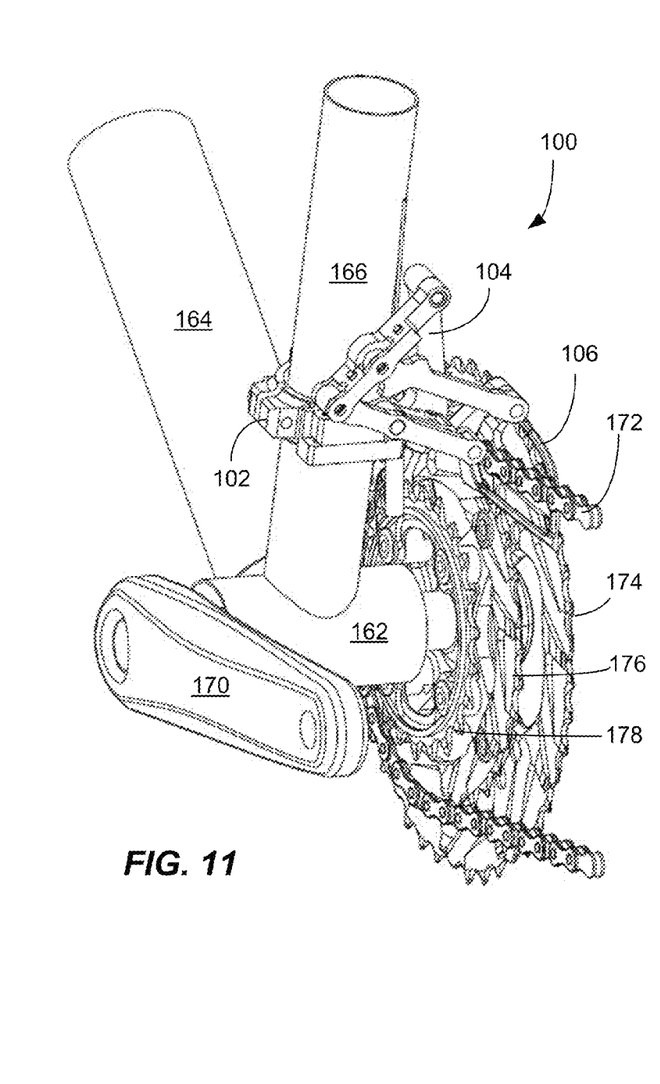
FIG. 11 illustrates a left-rear perspective view of an embodiment of a six link front derailleur in the middle gear position, according to the present invention.
Figure 12:
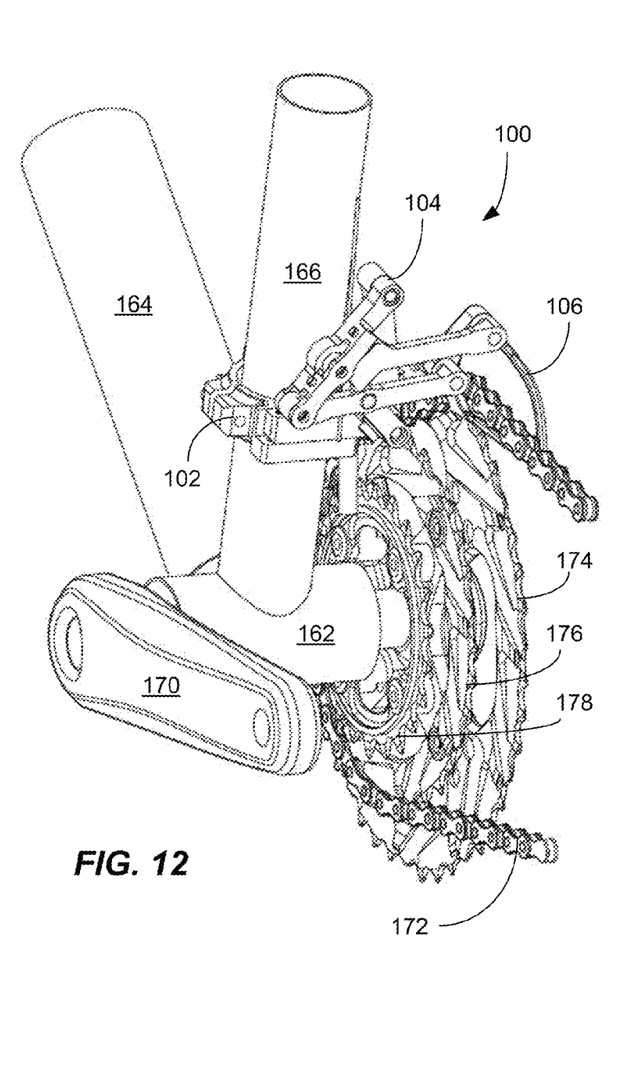
FIG. 12 illustrates a left-rear perspective view of an embodiment of a six link front derailleur during an up-shift from a middle gear position to a upper gear position, according to the present invention.

FIGS. 11 and 12 illustrates a left-rear perspective views of an embodiment of a six link front derailleur 100 in the middle gear position and during an up-shift from a middle gear position to a upper gear position, respectively, according to the present invention. As can be seen particularly in FIG. 12, the bicycle chain 172 is actually lifted by the chain guide 106 during the up-shift.

Figure 13:
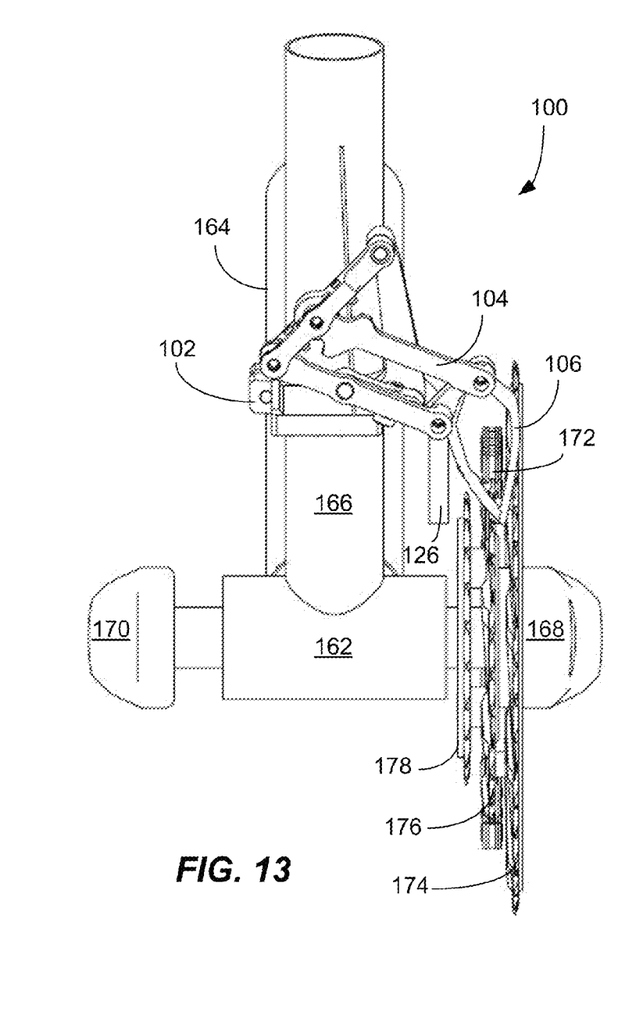
FIG. 13 illustrates a rear view of an embodiment of a six link front derailleur in the middle gear position, according to the present invention.
Figure 14:
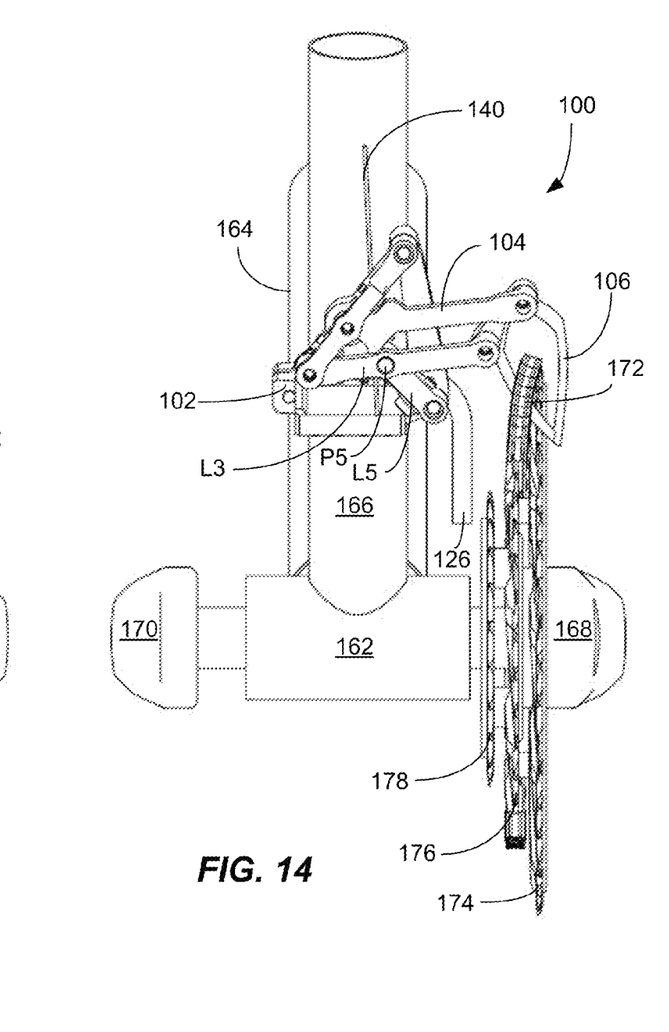
FIG. 14 illustrates a rear view of an embodiment of a six link front derailleur during an up-shift from a middle gear position to a upper gear position, according to the present invention.

FIG. 13 illustrates a rear view of an embodiment of a six link front derailleur 100 in the middle gear position, according to the present invention. FIG. 14 illustrates the same rear view of an embodiment of a six link front derailleur 100 during an up-shift from a middle gear position to a upper gear position, according to the present invention. FIGS. 13 and 14 illustrate how a chain deflector bar 126 may be oriented to prevent a bicycle chain 172 from falling off the inside of inner chain ring 178. As shown in FIG. 14, relative to FIG. 13, control cable 140 acts in a top-pull configuration to pull up on fifth pivot point P5 to lift links L5 and consequently L3 and all of the other free moving links.

Figure 15:
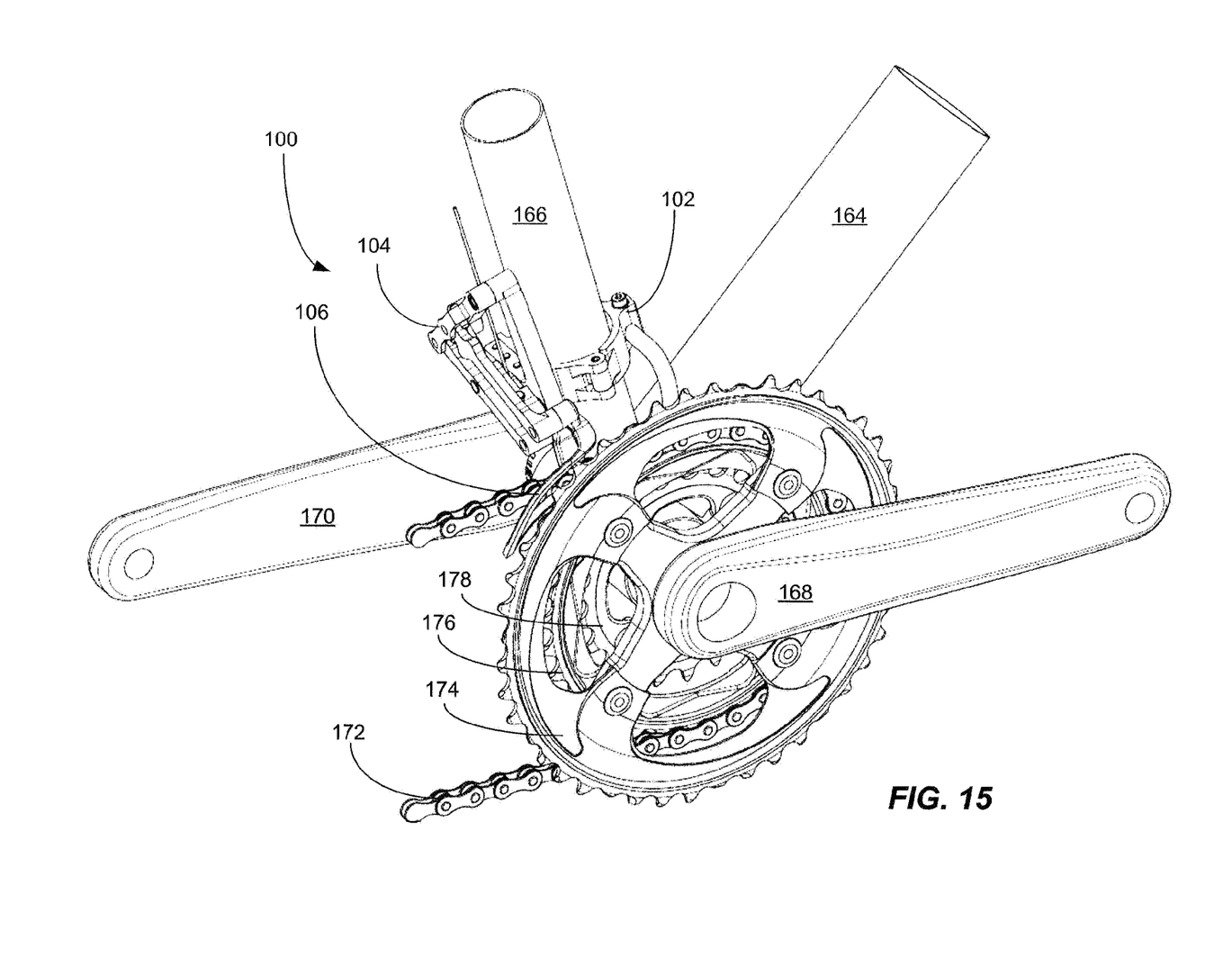
FIG. 15 illustrates a right side perspective view of an embodiment of a six link front derailleur in the middle gear position, according to the present invention.

FIG. 15 illustrates a right side perspective view of an embodiment of a six link front derailleur 100 in the middle gear position, according to the present invention.

Figure 16:
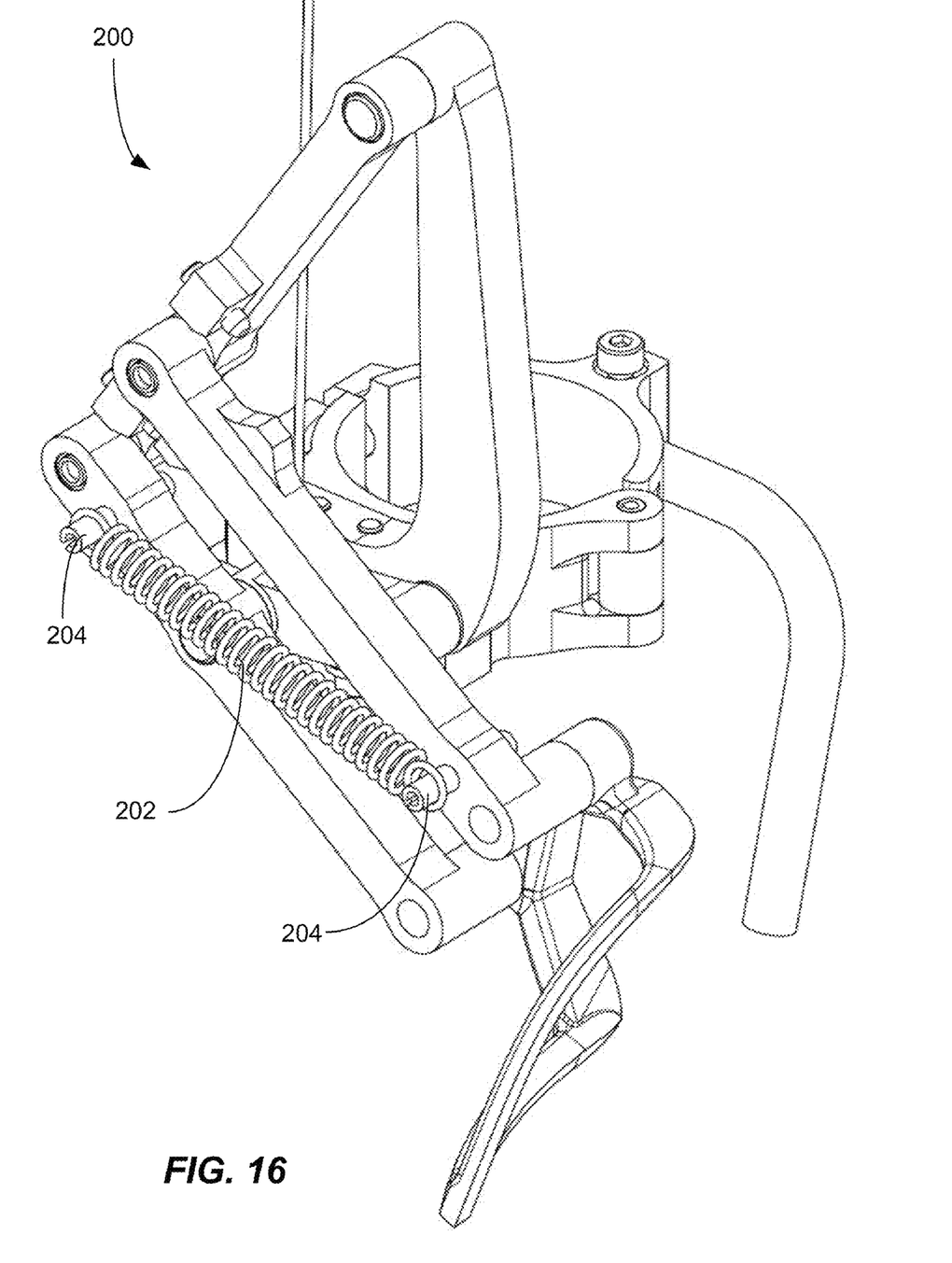
FIG. 16 illustrates a right-rear perspective view of an alternative embodiment of a six link front derailleur employing a tension bias spring, according to the present invention.

FIG. 16 illustrates a perspective view of an alternative embodiment of a six link front derailleur 200 employing a tension bias spring 202, according to the present invention. Tension bias spring 202 may be mounted at opposite ends by posts 204 or other equivalent structure for securing an end of a spring. It will also be noted that the links of derailleur 200 are longer than those of derailleur 100. Though derailleur 200 is less compact than derailleur 100, its chain guide path is more linear.

In addition to illustrating derailleur 100 in its intended environment on a portion of a bicycle, FIGS. 9-15 illustrate portions of three bicycle frame members, namely, a bottom bracket 162, down tube 164 and seat tube 166. FIGS. 9-15 illustrate also illustrate various portions of a crank set including a right crank arm spider 168 and a left crank arm 170. A right crank arm spider 168 may support up to three chain rings, namely, outer chain ring 174, middle chain ring 176 and inner chain ring 178. Additional specific embodiments of front derailleurs consistent with the present invention will now be described.

An embodiment of a front derailleur for shifting a bicycle chain is disclosed. The front derailleur may include an attachment mechanism configured for affixing the front derailleur to a bicycle frame member. According to one embodiment, the attachment mechanism may be attachment mechanism 102 as shown in FIGS. 1-15 and as described herein. In other embodiments, conventional attachment mechanisms, such as those described in the cited prior art may be employed according to the present invention by simple modifications known to those of ordinary skill in the art.

The embodiment of a front derailleur may further include a chain guide configured for surrounding and contacting a bicycle chain during shifting. According to one embodiment, the chain guide may be chain guide 106 as shown in FIGS. 1-15 and as described herein. According to other embodiments, conventional chain guides, such as those described in the cited prior art may be employed according to the present invention by simple modifications known to those of ordinary skill in the art.

The embodiment of a front derailleur may further include a movement mechanism supported by the attachment mechanism and supporting the chain guide. The movement mechanism may be configured for selectively positioning the chain guide above selected chain rings, thereby causing the bicycle chain to shift gears, according to one embodiment. According to another embodiment, the movement mechanism may further include seven pivot points and six links.

The six links and their seven associated pivot points may be oriented as follows, according to a particular embodiment of the present invention. A first link may be formed between first and second pivot points, located adjacent to the chain guide. A second link may begin at the first pivot point and extending away from the chain guide and ending at a third pivot point. A third link may begin at the second pivot point and extending away from the chain guide. The third link may be parallel to the second link. The third link may be connected to a fifth pivot point at an intermediate position along the third link and ending at a fourth pivot point. A fourth link may begin at the fourth pivot point, and be connected to the third pivot point at an intermediate position along the fourth link. The fourth link may end at a sixth pivot point. A fifth link may extend from the fifth pivot point toward a seventh pivot point. A sixth link, which is fixed to the attachment mechanism, may extend between the sixth and seventh pivot points.

According to another embodiment, the derailleur may include a horizontal adjustment mechanism located between the attachment mechanism and the movement mechanism. The horizontal adjustment mechanism may be configured for precise horizontal adjustment of the movement mechanism relative to the attachment mechanism. According to another embodiment, the attachment mechanism may further include a deflector bar configured to adjustably extend toward an inner chain ring, thereby preventing the bicycle chain from falling inside of an inner chain ring.

According to another embodiment of a front derailleur, the chain guide may be configured to vertically lift a bicycle chain up off a smaller chain ring and onto a larger chain ring during an up-shift. According to another embodiment of a front derailleur, the chain guide may be configured to vertically pull a bicycle chain down off a larger chain ring and onto a smaller chain ring during a down-shift.

According to another embodiment of a front derailleur, the center lines of the first through the fifth pivot points travel spatially relative to the attachment mechanism during shifting. According to yet another embodiment of a front derailleur, the center lines of the sixth and the seventh pivot points are spatially fixed in place relative to the attachment mechanism at all times during shifting. According to still another embodiment of a front derailleur, the first through the fifth links (L1-L5) travel spatially relative to the attachment mechanism during shifting. According to another embodiment of a front derailleur, the sixth link may be spatially fixed in place relative to the attachment mechanism at all times during shifting.

According to another embodiment, the front derailleur may further include a torsion spring biasing the chain guide toward an inner position. In one embodiment, the torsion may be located around the third pivot point and acts upon the second and the fourth links (L2 and L4). According to another embodiment, the front derailleur may further include a tension spring biasing the chain guide toward an inner position, see, e.g., tension spring 202 in FIG. 16. According to one embodiment, the tension spring may be attached at one end near the first pivot point on the second link (L2) and the compression spring may be attached at an opposite end to the third link (L3) near the fourth pivot point (P4).

According to another embodiment, the front derailleur may further include a high stop adjustment mechanism. The high stop adjustment mechanism may include a high stop set screw with a bottom extending toward a high stop on the second link (L2). According to another embodiment, the front derailleur may further include a low stop adjustment mechanism. The low stop adjustment mechanism may be a low stop set screw with a bottom extending toward a low stop on the second link (L2). According to another embodiment, the front derailleur may further include a control cable attachment mechanism attached to the fifth link near the fifth pivot point acting in tension against a biasing element to lift the fifth link against a spatially fixed seventh pivot point during up-shifting. According to still another embodiment of the front derailleur, the movement mechanism may be configured to cause a slight counterclockwise rotation of the chain guide during up-shifting when an annular opening of the chain guide is viewed in cross section in a direction of bicycle chain travel.

Another embodiment of a front derailleur for shifting a bicycle chain is disclosed. The derailleur may include an attachment mechanism for attachment to a bicycle frame member and a chain guide configured for surrounding a bicycle chain and a movement mechanism connected between the attachment mechanism and the chain guide. The movement mechanism may further include a first pivot point (P1) rotationally connecting a first link (L1) on the chain guide with a second link (L2) extending from the chain guide. The movement mechanism may further include a second pivot point (P2) rotationally connecting the first link (L1) on the chain guide to a third link (L3) extending from the chain guide. The first and second pivot points (P1 and P2) are spaced apart from each other and the second and third links (L1 and L2) are oriented parallel to one another. The movement mechanism may further include a fifth pivot point (P5) located at an intermediate position along the third link (L3) and rotationally connected to a fifth link (L5). The movement mechanism may further include a fourth pivot point (P4) located opposite the second pivot point (P2) on the third link (L3). The fourth pivot point (P4) may be rotationally connected to a fourth link (L4). The movement mechanism may further include a third pivot point (P3) located along the fourth link (L4). The third pivot point (P3) may rotationally connect the second link (L2) to the fourth link (L4). The first and third pivot points (P1 and P3) may be disposed at opposite ends of the second link (L2). The movement mechanism may further include a sixth pivot point (P6) located opposite the fourth pivot point (P4) on the fourth link (L4), the sixth pivot point (P6) rotationally connecting the fourth link (L4) to a sixth link (L6). The movement mechanism may further include a seventh pivot point (P7) located opposite the sixth pivot point (P6) on the sixth link (L6), the seventh pivot point (P7) rotationally connecting the sixth link (L6) to the fifth link (L5).

Another embodiment of a front derailleur movement mechanism is disclosed. The movement mechanism may be located between a fixed bicycle frame member and a chain guide for selectively shifting the chain guide surrounding a bicycle chain to realize gear shifting between inner and outer chain rings of a crank set during pedaling. The movement mechanism may further include a first link formed between first and second pivot points, the first link and the first and second pivot points located adjacent to the chain guide. The movement mechanism may further include a second link beginning at the first pivot point and extending away from the chain guide and ending at a third pivot point. The movement mechanism may further include a third link beginning at the second pivot point, extending away from the chain guide and parallel to the second link and ending at a fourth pivot point, the third link including a fifth pivot point disposed between the second and the fourth pivot points. The movement mechanism may further include a fourth link beginning at the fourth pivot point, connecting to the second link at the third pivot point and ending at a sixth pivot point. The movement mechanism may further include a fifth link extending from the fifth pivot point toward a seventh pivot point. The movement mechanism may further include a fixed position sixth link fixed to the attachment mechanism between the sixth and seventh pivot points.

An embodiment of a front derailleur movement mechanism for shifting a bicycle chain is disclosed. According to this embodiment, the front derailleur movement mechanism may be located between a fixed bicycle frame member and a chain guide for selectively shifting the chain guide surrounding a bicycle chain to realize gear shifting between inner and outer chain rings of a crank set during pedaling. According to this embodiment of a derailleur, the movement mechanism may include six links (L1-L6) connected at seven pivot points (P1-P7).

The embodiments of derailleurs 100, 200, 300 and 400 disclosed herein and their components may be formed of any suitable materials, such as aluminum, stainless steel, titanium, carbon fiber composite materials and the like. The component parts may be manufactured according to methods known to those of ordinary skill in the art, including by way of example only, machining and investment casting. Assembly and finishing of front derailleurs according to the description herein is also within the knowledge of one of ordinary skill in the art and, thus, will not be further elaborated herein.

In understanding the scope of the present invention, the term "configured" as used herein to describe a component, section or part of a device may include any suitable mechanical hardware that is constructed or enabled to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part", "section", "portion", "member", or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While the foregoing features of the present invention are manifested in the detailed description and illustrated embodiments of the invention, a variety of changes can be made to the configuration, design and construction of the invention to achieve those advantages. Hence, reference herein to specific details of the structure and function of the present invention is by way of example only and not by way of limitation.

What is claimed is:

1. A front derailleur for shifting a bicycle chain, comprising:
   an attachment mechanism configured for affixing the front derailleur to a bicycle frame member;
   a chain guide configured for surrounding and contacting a bicycle chain during shifting; and
   a movement mechanism supported by the attachment mechanism and supporting the chain guide, the movement mechanism configured for selectively positioning the chain guide above and behind selected chain rings, thereby causing the bicycle chain to shift gears, the movement mechanism further comprising seven pivot points and six links, the six links including:
   a first link formed between first and second pivot points, located adjacent to the chain guide;
   a second link beginning at the first pivot point and extending away from the chain guide and ending at a third pivot point;
   a third link beginning at the second pivot point and extending away from the chain guide and parallel to the second link, connected to a fifth pivot point at an intermediate position along the third link and ending at a fourth pivot point;
   a fourth link beginning at the fourth pivot point, connected to the third pivot point at an intermediate position along the fourth link and ending at a sixth pivot point;
   a fifth link extending from the fifth pivot point toward a seventh pivot point; and
   a sixth link fixed to the attachment mechanism extending between the sixth and seventh pivot points.

2. The front derailleur of claim 1, further comprising a horizontal adjustment mechanism between the attachment mechanism and the movement mechanism, the horizontal adjustment mechanism configured for precise horizontal adjustment of the movement mechanism relative to the attachment mechanism.

3. The front derailleur of claim 1, wherein the attachment mechanism further comprises a deflector bar configured to adjustably extend toward an inner chain ring thereby preventing the bicycle chain from falling inside of an inner chain ring.

4. The front derailleur of claim 1, wherein the chain guide is configured to vertically lift a bicycle chain up off a smaller chain ring and onto a larger chain ring during an up-shift.

5. The front derailleur of claim 1, wherein the chain guide is configured to vertically pull a bicycle chain down off a larger chain ring and onto a smaller chain ring during a down-shift.

6. The front derailleur of claim 1, wherein center lines of the first through the fifth pivot points travel spatially relative to the attachment mechanism during shifting.

7. The front derailleur of claim 1, wherein center lines of the sixth and the seventh pivot points are spatially fixed in place relative to the attachment mechanism at all times during shifting.

8. The front derailleur of claim 1, wherein the first through the fifth links travel spatially relative to the attachment mechanism during shifting.

9. The front derailleur of claim 1, wherein the sixth link is spatially fixed in place relative to the attachment mechanism at all times during shifting.

10. The front derailleur of claim 1, further comprising a torsion spring biasing the chain guide toward an inner position.

11. The front derailleur of claim 10, wherein the torsion spring is located around the third pivot point and acts upon the second and the fourth links.

12. The front derailleur of claim 1, further comprising a tension spring biasing the chain guide toward an inner position.

13. The front derailleur of claim 12, wherein the tension spring is attached at one end near the first pivot point on the second link, the compression spring attached at an opposite end to the third link near the fourth pivot point.

14. The front derailleur of claim 1, further comprising a high stop adjustment mechanism, the high stop adjustment mechanism comprising a high stop set screw with a bottom extending toward a high stop on the second link.

15. The front derailleur of claim 1, further comprising a low stop adjustment mechanism, the low stop adjustment mechanism comprising a low stop set screw with a bottom extending toward a low stop on the second link.

16. The front derailleur of claim 1, further comprising a control cable attachment mechanism attached to the fifth link near the fifth pivot point acting in tension against a biasing element to lift the fifth link against a spatially fixed seventh pivot point during up-shifting.

17. The front derailleur of claim 1, wherein the movement mechanism causes slight counterclockwise rotation of the chain guide during up-shifting when an annular opening of the chain guide is viewed in cross section.

18. A front derailleur having an attachment mechanism for attachment to a bicycle frame member and a chain guide configured for surrounding a bicycle chain and a movement mechanism connected between the attachment mechanism and the chain guide, the movement mechanism, comprising:
   a first pivot point rotationally connecting a first link on the chain guide with a second link extending from the chain guide;
   a second pivot point rotationally connecting the first link on the chain guide to a third link extending from the chain guide, wherein the first and second pivot points are spaced apart from each other and the second and third links are oriented parallel to one another;
   a fifth pivot point located at an intermediate position along the third link and rotationally connected to a fifth link;

a fourth pivot point located opposite the second pivot point on the third link, the fourth pivot point rotationally connected to a fourth link;

a third pivot point located along the fourth link, the third pivot point rotationally connecting the second link to the fourth link, the first and third pivot points disposed at opposite ends of the second link;

a sixth pivot point located opposite the fourth pivot point on the fourth link, the sixth pivot point rotationally connecting the fourth link to a sixth link; and a seventh pivot point located opposite the sixth pivot point on the sixth link, the seventh pivot point rotationally connecting the sixth link to the fifth link.

* * * * *